(12) United States Patent
Pozarnsky et al.

(10) Patent No.: US 6,837,918 B2
(45) Date of Patent: Jan. 4, 2005

(54) PROCESS FOR THE MANUFACTURE OF NANOPARTICLE ORGANIC PIGMENTS

(75) Inventors: Gary A. Pozarnsky, St. Paul, MN (US); William A. Hendrickson, Stillwater, MN (US); Brian J. Walker, Inver Grove Heights, MN (US)

(73) Assignee: Aveka, Inc., Woodbury, MN (US)

( * ) Notice: Subject to any disclaimer, the term of this patent is extended or adjusted under 35 U.S.C. 154(b) by 0 days.

(21) Appl. No.: 10/026,493

(22) Filed: Dec. 20, 2001

(65) Prior Publication Data

US 2003/0116017 A1 Jun. 26, 2003

(51) Int. Cl.$^7$ ............................. B01D 7/02; C04B 14/00
(52) U.S. Cl. ...................... 95/149; 23/294 R; 46/243; 106/400
(58) Field of Search ............................. 95/149; 96/243; 106/400, 401; 23/294 R

(56) References Cited

U.S. PATENT DOCUMENTS

| | | | |
|---|---|---|---|
| 1,509,824 A | | 9/1924 | Booth et al. |
| 3,938,969 A | * | 2/1976 | Sebenik et al. |
| 3,941,609 A | | 3/1976 | Stern .......................... 106/290 |
| 4,104,276 A | | 8/1978 | Kranz et al. |
| 4,140,695 A | * | 2/1979 | Takeuchi et al. |
| 4,252,421 A | | 2/1981 | Foley, Jr. |
| 4,576,725 A | | 3/1986 | Miura et al. |
| 4,638,025 A | | 1/1987 | Fuhrman |
| 4,654,229 A | * | 3/1987 | Morita et al. |
| 5,030,669 A | | 7/1991 | Hendrickson et al. |
| 5,106,533 A | | 4/1992 | Hendrickson et al. |
| 5,128,081 A | | 7/1992 | Siegel et al. |
| 5,186,872 A | * | 2/1993 | Nishiwaki et al. |
| 5,318,623 A | * | 6/1994 | Azuma et al. |
| 5,857,840 A | | 1/1999 | Suda et al. |
| 5,958,329 A | | 9/1999 | Brown |
| 6,050,787 A | | 4/2000 | Hesketh |
| 6,110,266 A | * | 8/2000 | Gonzalez-Blanco et al. |
| 6,267,942 B1 | | 7/2001 | Mori et al. |

FOREIGN PATENT DOCUMENTS

| | | |
|---|---|---|
| EP | 0 091 109 | 10/1983 |
| EP | 60116705 | 6/1985 |
| EP | 0 154 839 | 9/1985 |
| EP | 0 209 403 A2 | 1/1987 |
| GB | 736590 | 9/1955 |
| JP | XP-002242201 | 1/1994 |
| WO | WO 00/05017 | 2/2000 |

* cited by examiner

Primary Examiner—Duane S. Smith
(74) Attorney, Agent, or Firm—Mark A. Litman & Associates, P.A.

(57) ABSTRACT

A process and apparatus collects pigment nanoparticles by forming a vapor of a pigment that is solid at room temperature, the vapor of the pigment being provided in an inert gaseous carrying medium. At least some of the pigment is solidified within the gaseous stream. The gaseous stream and pigment material is moved in a gaseous carrying environment into or through a dry mechanical pumping system. While the particles are within the dry mechanical pumping system or after the nanoparticles have moved through the dry pumping system, the pigment material and nanoparticles are contacted with an inert liquid collecting medium.

17 Claims, 3 Drawing Sheets

PROCESS FOR THE MANUFACTURE OF NANOPARTICLE ORGANIC PIGMENTS

BACKGROUND OF THE INVENTION

Field of the Invention

Figure 1:
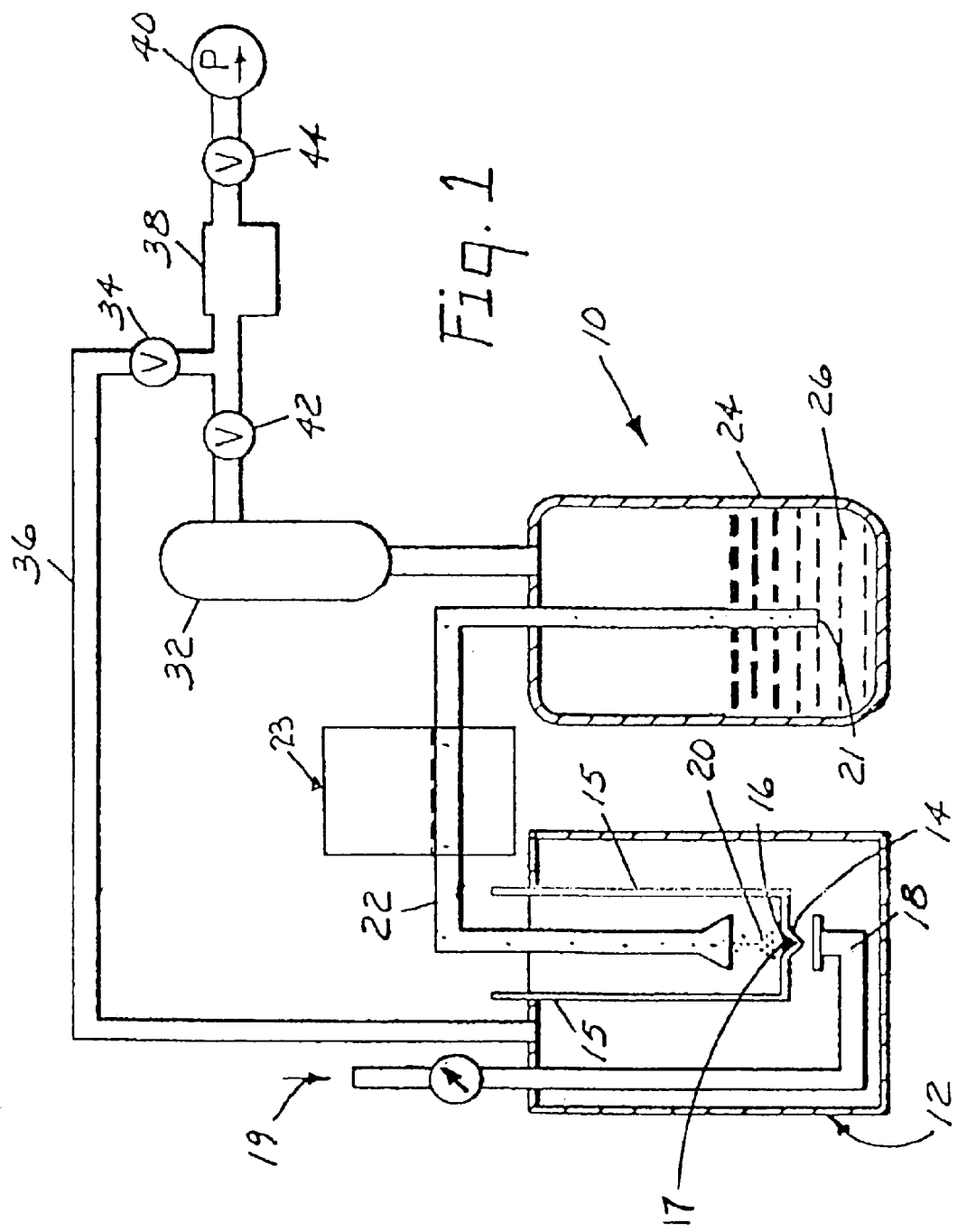
Figure 2:
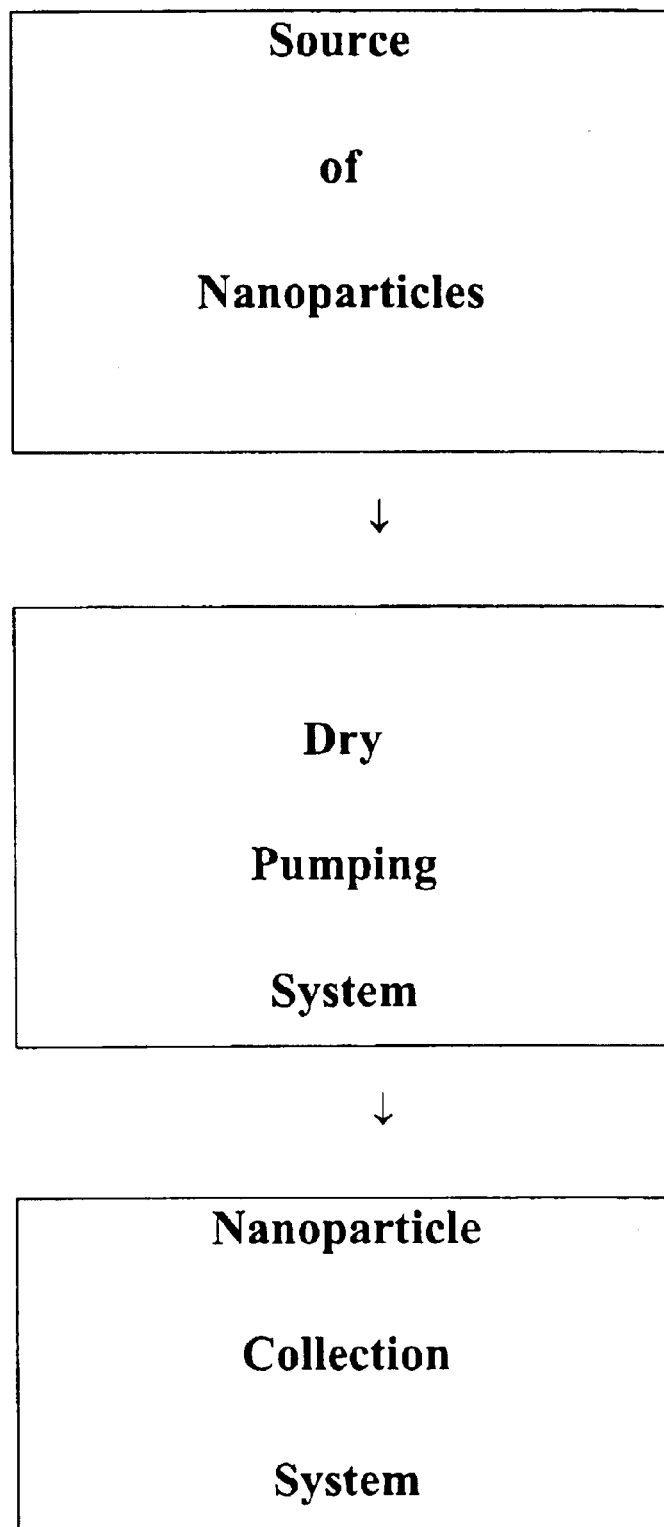
Figure 3:
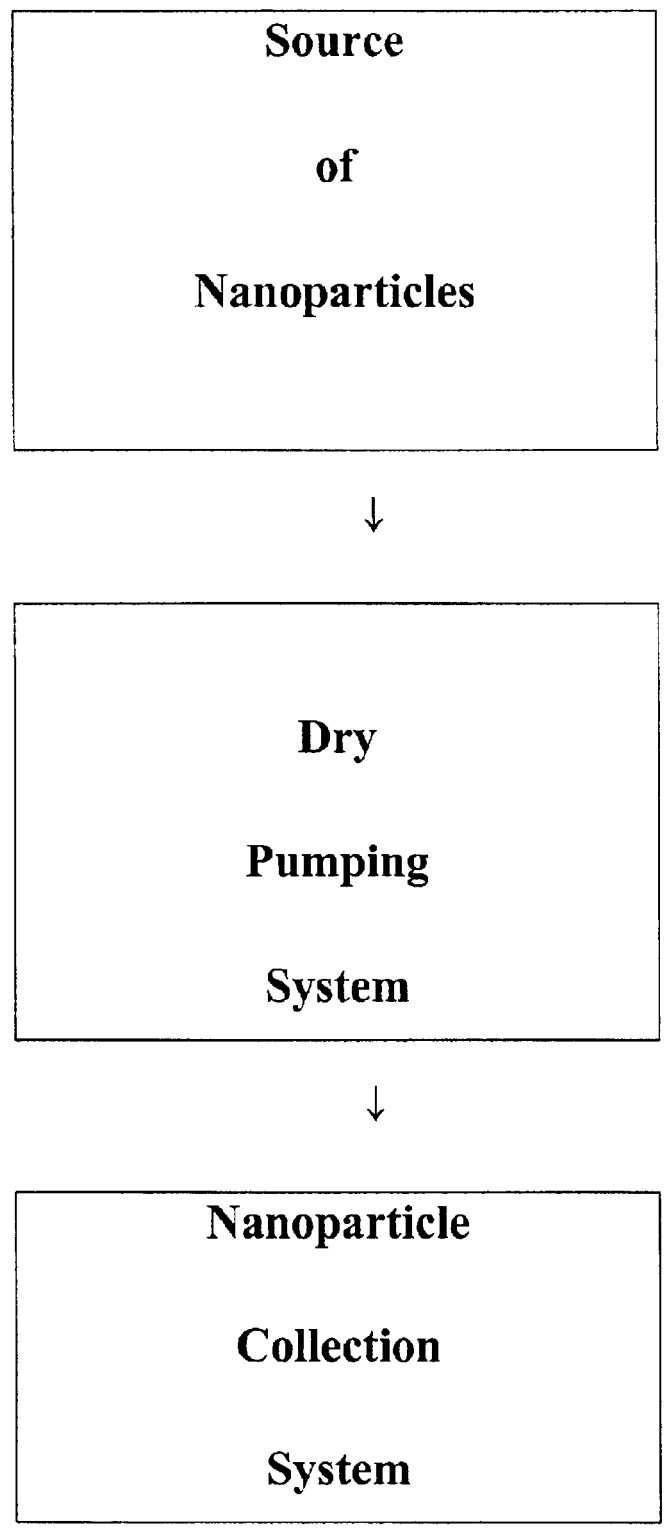

Pigments are widely used as colorants, for example, in paints, varnishes, polymers, toners, coatings, and inks. Such pigments generally have average particle sizes (diameters) in the range of 0.1 to 10 micrometers, more typically, 1 micrometer or greater. To achieve these particle sizes, mechanical devices are most often used to comminute relatively large solid particulate matter into smaller primary particles. The most common mechanical devices include ball mills, attritors, sand/bead mills, and roll mills. All of these devices require moving parts in order to generate the mechanical forces required to break up the pigment particles. Milling times of several hours are typical, with certain pigments requiring a day or longer in order to break up, or comminute, the particles. Moreover, comminution of the pigment by contact with the milling media results in pigment surfaces exhibiting a high number of surface asperities, a large variation in particle size, and significant variation in particles and their properties from batch to batch. Furthermore, contamination of the dispersions from the mechanical parts of the milling equipment can result due to the intimate contact of the pigment with the milling media. Silicon dioxide, a grinding medium, is a common contaminant found after sand milling, for example.

There is an inherent disadvantage of mechanical processing of pigments in the resulting fact of the large breadth of distribution of particle sizes resulting from mechanical processes. This results in the presence of particles having diameters of one micrometer or greater, even in dispersions where the average particle size is significantly less. For dispersions requiring transparency in the final article, these larger particles lead to unwanted light scattering and are detrimental. The presence of these micrometer sized particles also leads to an inherent instability, or tendency to flocculate, in the dispersions. For a more general description of present limitations in dispersing solids in liquids, see D. J. Walbridge, Solid/liquid Dispersions, Th. F. Tadros, Ed., Academic Press, 1987, p. 50. Additionally, the uncontrolled variation in particle sizing affects the performance of particles both within a single batch and between batches. As the specifications for ingredients becomes more stringent, the failure to control the parameters of particle products is a significant problem that may lead to waste and product refusal.

More stable pigment dispersions can be obtained by chemically altering the process for manufacturing pigment and the resulting pigments as described in EP 1,544,839. This type of process often results in smaller average particle diameters but has the disadvantages of requiring a chemical pretreatment of the pigment, still requires mechanical milling, and still provides a dispersion having a wide particle size distribution.

Dry organic pigments, such as for example members of the phthalocyanine family, have been generated by evaporative techniques. Wagner et al., J. Matls. Sci., 17, 2781 (1982), describes a train sublimator for purification of pigments in the phthalocyanine family with the main purpose of removing impurities present in the as-supplied pigments so as to allow preparation of ultrapure pigment thin films for photovoltaic cells. The only reference to particle size of the purified pigments is for vanadyl phthalocyanine, in which the particle size of the sublimed pigment, even after extensive milling (16 days), could not be reduced below 2 micrometers. A further reduction in particle size was obtained after acid pasting, a technique commonly used to generate pigment grade phthalocyanines (see R. Lambourne, "Paint and Surface Coatings", John Wiley and Sons (1987) p. 159).

EPA 209403 (Toyatoma) describes a process for preparing dry ultrafine particles of organic compounds using a gas evaporation method. The ultrafine particles, having increased hydrophilicity, are taught to be dispersible in aqueous media. Particle sizes obtained are from 500 Angstroms to 4 micrometers. These particles are dispersed by ultrasound to provide mechanical energy that breaks up aggregates, a practice that in itself is known in the art. The resulting dispersions have improved stability towards flocculation.

Kimura and Bandow, Bull. Chem. Soc. Japan, 56, 3578 (1983) disclose the non-mechanical dispersing of fine metal particles. This method for prepares colloidal metal dispersions in nonaqueous media also uses a gas evaporation technique. General references by C. Hayashi on ultrafine metal particles and the gas evaporation technique can be found in *Physics Today*, December 1987, p. 44 and J. Vac. Sci. and Tech., A5, p. 1375 (1987).

Numerous references have appeared describing use of the gas evaporation technique to produce ultrafine metal powders, especially magnetic metal/metal oxide powders (often referred to as magnetic pigments). These appear to exclusively refer to a dry process and do not involve contact with liquids. Yatsuya et al., Jpn. J. Appl. Phys., 13, 749 (1974), involves evaporation of metals onto a thin film of a hydrocarbon oil (VEROS technique) and is similar to Kimura (supra). Nakatani et al., J. Magn. Magn. Mater., 65, 261 (1987), describe a process in which surface active agents stabilize a dispersion of a ferromagnetic metal (Fe, Co, or Ni) vaporized directly into a hydrocarbon oil to give a ferrofluid using a metal atom technique. The metal atom technique requires high vacuum (pressures less than $10^{-3}$ torr) such that discrete metal atoms impinge onto the surface of a dispersing medium before the metal atoms have a chance to contact a second species in the gas phase. In this metal atom process, nucleation and particle growth occur in the dispersing medium, not in the gas phase. Thus, particle size is dependent on the dispersing medium and is not easily controlled. Additionally, U.S. Pat. No. 4,576,725 describes a process for making magnetic fluids which involves vaporization of a ferromagnetic metal, adiabatic expansion of the metal vapor and an inert gas through a cooling nozzle to condense the metal and form small metal particles, and impingement of the particles at high velocity onto the surface of a base liquid.

Other references for dispersing materials that are delivered to a dispersing medium by means of a gas stream include U.S. Pat. No. 1,509,824, which describes introduction of a molecularly dispersed material, generated either by vaporization or atomization, from a pressurized gas stream into a liquid medium such that condensation of the dispersed material occurs in the liquid. Therefore, particle growth occurs in the dispersing medium, not in the gas phase, as described above. Furthermore, the examples given are all materials in their elemental form and all of which have appreciable vapor pressures at room temperature.

UK Patent 736,590 describes a process in which a finely divided pigment is carried by a gas stream and wetted by a liquid miscible with the final dispersing medium. The finely divided pigment is suspended in the gas stream during these steps, and then the wetted pigment is mixed with the dispersing medium. This method requires a pulverizer to first subject the pigment to mechanical forces prior to its introduction into the gas stream. Therefore, it suffers from many of the shortcomings cited above. Particle sizes on the order of 1 micrometer are obtained.

U.S. Pat. No. 4,104,276 discloses the conversion of crude copper phthalocyanine into a pigmentary form by introducing milled copper phthalocyanine into an organic or aqueous medium together with a basic copper phthalocyanine of specified formula.

Pigmented water-absorbable plastic materials, including contact lenses, are disclosed in U.S. Pat. No. 4,638,025 to contain an organic binder, a pigment, a hydrophilic polymerizable plastic material and a crosslinking agent. A binder such as cellulose acetate butyrate is required to keep the pigment in a dispersed form.

Contact lenses prepared from hydroxyethyl methacrylate containing copper phthalocyanine (commercially available and then milled) as a colorant are disclosed in U.S. Pat. No. 4,252,421.

U.S. Pat. No. 5,030,669 describes a method consisting essentially of the steps: (a) vaporizing a nonelemental pigment or precursor to a nonelemental pigment in the presence of a nonreactive gas stream to provide ultrafine nonelemental pigment particles or precursor to nonelemental pigment particles; (b) when precursor particles to a nonelemental pigment are present, providing a second gas capable of reacting with the ultrafine precursor particles to a nonelemental pigment and reacting the second gas with the ultrafine precursor particles to a nonelemental pigment to provide ultrafine nonelemental pigment particles; (c) transporting the ultrafine nonelemental pigment particles in said gas stream to a dispersing medium, to provide a dispersion of nonelemental pigment particles in the medium, the particles having an average diameter size of less than 0.1 micrometer; wherein the method takes place in a reactor under subatmospheric pressure in the range of 0.001 to 300 torr.

U.S. Pat. No. 5,106,533 provides a nonaqueous dispersion comprising pigment particles having an average size (diameter) of less than 0.1 micrometer dispersed in an organic medium. That invention provides an aqueous dispersion comprising certain classes of inorganic pigment particles having an average size (diameter) of less than 0.1 micrometer dispersed in a water or water-containing medium. The dispersions require less time for preparation, are more stable, have a more uniform size distribution, a smaller number average particle diameter, fewer surface asperities, and avoid contamination of dispersed material due to the presence of milling media and the wear of mechanical parts, these problems having been noted above for dispersions prepared by conventional methods employing mechanical grinding of particulates. Additionally, no chemical pretreatment of the pigment is required in order to achieve the fine particle sizes obtained in the final dispersion. The pigments of the dispersions are found to have narrower size distributions (standard deviations generally being in the range of ±0.5x, where x is the mean number average particle diameter), are more resistant to flocculation (i.e. the dispersions are stable, that is they are substantially free of settled particles, that is, no more than 10% of the particles settle out for at least 12 hours at 25° C.), and demonstrate superior overall stability and color as demonstrated by lack of turbidity, by increased transparency, and by greater tinctorial strength, compared to mechanically dispersed pigment dispersions. Furthermore, the method requires no mechanical energy, such as ultrasound, to break up aggregates. Aggregates do not form since there is no isolation of dry ultrafine pigment particles prior to contacting the dispersing medium. The dispersions of any organic or inorganic pigment or dispersion that can be generated from a pigment precursor, are prepared by a gas evaporation technique which generates ultrafine pigment particles. Bulk pigment is heated under reduced pressure until vaporization occurs. The pigment vaporizes in the presence of a gas stream wherein the gas preferably is inert (nonreactive), although any gas which does not react with the pigment may be used. The ultrafine pigment particles are transported to a liquid dispersing medium by the gas stream and deposited therein by bubbling the gas stream into or impinging the gas stream onto the dispersing medium.

U.S. Pat. No. 6,267,942 describes a process for manufacture of spherical silica particles. Silica gel particles to be dispersed in a mixed solution of an alkali silicate and an acid are required to have an average particle size of from 0.05 to 3.0 micrometers. In a case where the average particle size of the silica gel particles is smaller than 0.05 micrometers, mechanical strength of the spherical silica particles to be obtained will be low, and irregular particles are likely to form, such being unsuitable. Similarly, in a case where the average particle size of the silica gel particles is larger than 3.0 micrometers, mechanical strength of the spherical silica particles to be obtained will be low, and irregular particles are likely to form, such being unsuitable. The more preferred range of the average particle size of the silica gel particles is from 0.1 to 1.0 micrometers.

U.S. Pat. No. 5,958,329 describes a method and apparatus for producing nanoparticles (there defined as from 1 to 50 nano-meter diameter particles) at a high rate. Two chambers are separated by a narrow duct. A source material is provided from a lower chamber where the source material is heated (e.g., to vaporization and then continuously fed into an upper chamber. In the upper chamber, nanoparticles are nucleated, the nanoparticles being formed when the vapor fed from the lower chamber collides with a gas (inert or reactive) in the upper chamber. A cooled deposit site (e.g., defined as finger 107) collects the particles, which are then scraped from the collection site. The particles are said to move to the collection site in a natural connective flow stream.

U.S. Pat. No. 5,128,081 describes a method of preferential phase separation of aluminum oxide nanocrystalline ceramic material. The nanoparticles are collected on a cold surface (20). Following oxidation of the particles, a vacuum chamber (in which the particles were formed) is evacuated and the oxide particles are collected and consolidated under various atmospheric conditions, such as vacuum and selectively with oxygen and/or air.

The collection process in these particle manufacturing and particle treating processes is cumbersome, inefficient, costly, time-consuming and damaging to the particles. For the collection process, the chamber must be opened and particles scraped from the deposition surface. This requires a long term shut down of the system. Scraping of particles from the deposition surface will fracture some particles and leave others agglomerated. Scraping can also damage the deposition surface. The small elongate finger deposition surface allows for the production and collection of only small amounts of materials layering of collected particles reduces the efficiency of deposition onto the surface. Coating and surface treatment of the particles can be done, but only as re-dispersion of the dried and agglomerated particles.

An alternative method of particle collection is filtration. This is performed by placing in sequence a source of particles, a filtration medium and a vacuum source. The filter has two surfaces, one front surface facing the particle source and the other rear surface facing the vacuum source. The reduced pressure at the rear surface allows the higher pressure at the font surface to push gas and particles against the filter where the particles are entrapped. There are a number of problems in a filtration system, particularly when it is used with nanoparticles. For example, to collect nanoparticles having an average particles diameter of from 1 to 100 nanometers, the largest pore size in the filter must be less than about 1 nanometer. It is difficult to maintain an effective pressure across that filtration surface, even before particles start collecting. As nanoparticles collect on the filter surface, gas flow (and pressure driven movement) become more restricted, fewer particles can collect, and process efficiency diminishes. The particles clog pores rapidly and particles do not collect efficiently.

U.S. Pat. No. 5,857,840 describes a vacuum pump system for making a closed container vacuous, comprising a vacuum pump and a dust collector provided on a pipe connecting the closed container and the vacuum pump, the pipe including:

a main pipe having a first main pipe which connects the closed container and the collector and a second main pipe which connects the centrifugal collector and the vacuum pump;

a bifurcated pipe which is branched out from the first main pipe and connected to the vacuum pump;

a metal mesh dust collector disposed on the bifurcated pipe; and pipe switching means for switching over between the main pipe and a bifurcated pipe.

The dust collector is provided intermediate the source of dust and vacuum pump, which may include a dry pump.

U.S. Pat. No. 6,050,787 provides a dry pump comprising a magnetically responsive elastic tube stretched onto, thereby sealing to, a shaft with inlet and outlet ports at or adjacent to it's ends of the tube. Local to the inlet port a magnetic field is generated in the enclosing body. This field is substantially concentric to the tube, which then responds by expanding circumferentially towards the magnetic field. This creates a volume between the tube and shaft, the length of tube outside the influence of the magnetic field remains sealed upon the shaft. Subsequent movement of the magnetic field along the axis of the pump gives transport of this volume and any media now enclosed within it from the inlet port to the outlet port, whereupon reduction of the magnetic field results in exhaustion of the volume. This cycle results in pumping action.

SUMMARY OF THE INVENTION

A particle manufacture and collection system with increased collection efficiency for the collection of nanoparticles provides a source of particles, a dry mechanical pumping system, and a particle collection surface. The positioning of a dry mechanical pumping system in advance of or contemporaneously with the particle collection surface maintains a particle moving effort, without wetting particles and causing them to agglomerate, and dramatically increases collection efficiency by as much as a factor of two.

Small particles of pigments are prepared by any evaporative method used in conjunction with a unique collection method that increases the production efficiency of the process by dramatic degrees. The process comprises evaporating a pigment, associating the vaporized pigment material with a non-reactive gas phase and then providing a mechanical pump that either directs the gas phase pigment through the mechanical pump into a liquid condensation-collection zone or draws the gas phase into a combination liquid condensation-collection zone within the mechanical pump. The non-pigment gaseous material remaining after condensation removal of pigment material from contact with the liquid condensation/collection liquid is withdrawn from the material stream, while the liquid condensing phase with the condensed pigment particles may be already a dispersion of pigment particles in a liquid phase, it may also be separated, the liquid condensing phase carrier removed, and the particles collected, for example as dry particles. As compared to known prior art methods, the use of the intermediate positioned mechanical pump or contemporaneous mechanical pump and condensation-collection zone dramatically and unexpectedly increases the overall collection/manufacturing efficiency of the process by at least 25% and by up to 100% or more.

BRIEF DESCRIPTION OF THE FIGURES

FIG. 1 is a schematic diagram of one embodiment of an apparatus for providing pigment dispersions of the present invention.

FIG. 2 is a block diagram of the process of the invention.

DETAILED DESCRIPTION OF THE INVENTION

The existence of pigmentaceous nanoparticulate materials such as organic materials, metal oxides and other pigments has been known for several years now; however, the production efficiency of these materials is still extremely low from the existing processes. This has had a detrimental effect on the availability and therefore the utilization of these advantageous materials in various products, especially in the area of printing inks, paints, polymer colorants and toners., A particle collection system with increased collection efficiency for the collection of nanoparticles according to the invention comprises a source of particles (particularly an evaporative source), a mechanical pumping system, and a particle collection surface. The position of the mechanical pumping system in advance of or coincident with the particle collection liquid medium maintains a particle moving effort, without prematurely wetting particles and causing them to agglomerate, and dramatically and significantly increases collection efficiency.

The placement of the collection units between the nanoparticle source and vacuum pumps causes severe problems in maintaining system vacuum and related high evaporation rates. Wet collection systems also are difficult to operate in a vacuum environment A source of nanoparticles is provided. The source of the pigments may be a primary source where particles are being manufactured (e.g., sputtering, spray drying, evaporation, aerial condensation, aerial polymerization, and the like). The source of nanoparticles for the coating or treating process only may also be a secondary source of particles, where the particles have been previously manufactured and are being separately treated (e.g., coating, surface oxidation, surface etching, and the like). These nanoparticles are provided in a gaseous medium that is of a sufficient gas density to be able to support the particles in flow. That is, there must be sufficient gas that when the gas is moved, the particles will be carried. With nanoparticles (e.g., particles having number average diameters of 1 to 100 nm, preferably 1 to 80 nm, or 1 to 70 nm, and as low as 1 to 50 nm) only a small gas pressure is needed, such as at least 0.25 Torr although higher pressures greater than 0.25 Torr, greater than 0.4 Torr, greater than 0.6 Torr, and greater than 0.75 Torr greater than 0.9 Torr are preferred.

The gas carrying medium for the particles may be or have been reactive with the particles or may have some residual reactive materials in the gas. It is preferred, mainly for preservation of carrying and collecting surfaces, that the gas is relatively inert to the apparatus environment and to the particles themselves. Gases such as nitrogen, carbon dioxide, helium, neon, air and the like are preferred, although chemical inertness is the single significant criterion for the gas.

The propulsion system for the gas carrying medium and the nanoparticles is a mechanical pumping system for gases. A dry mechanical pumping system may be used to prevent contamination of the particles by lubricants. These dry mechanical pumping systems for gases are well known in the semiconductor industry for conveying air, particulate and vapors without collection occurring in the pump. They are pumping systems that utilize oil-less seals to maintain vacuum conditions at the pump inlet. Examples of such mechanical dry pumps and dry vacuum mechanical pumps in the literature are found in U.S. Pat. No. 4,452,572 (Robert Evrard) generates a dry vacuum when acting as an additional stage to a conventional vacuum pump. It cites a tubular diaphragm that admits a pressure differential across the diaphragm to allow the diaphragm to conform to the contour of the pumping chamber body and thus expel gas via a top valve. U.S. Pat. No. 5,971,711 describes a control system for pumps, including dry pumps based on a Roots system pump.

Other general disclosures of dry mechanical pumps are provided in U.S. Pat. Nos. 6,090,222; 6,161,575; 5,846,062 (which describes a screw type dry vacuum pump having dual shafts is disclosed, whereby the process gas is transported through three compartments, a gas admittance pump section, a central drive motor section, and a gas discharge pump section. By placing the drive motor in the center of the pump, it becomes possible to design a pump having the dual shafts supported only at one end, thus enabling to mount the rotors at the free ends of the pump which are closed with end plates which can be removed easily for servicing the pump sections. Synchronous operation of the dual shaft pump by magnetic coupling enables to lower power consumption and to extend the range of operable pressures.

The collecting medium for the nanoparticles may comprise electrostatic surface collectors, electrostatic filter collectors, porous surfaces (e.g., fused particle surfaces), centrifugal collectors, wet scrubbers, and physical filter collectors. The physical filter collectors are more amenable in the practice of the present invention because the pressure on the rear side of the filtering medium is not the only or even the primary driving force for movement of the particles towards and against the filtering surface. Wet scrubbers are more amenable to this arrangement due to process and safety factors allowing more volatile solvents to be utilized away from the formation chamber for the nanoparticles. Wet scrubbers also provide slurries suitable for post-treatment and polymer coating by in-situ polymerization, particularly in the case of fluoropolymer coatings.

The use of the present arrangement of nanoparticle source, dry pump and collector has been found to increase particle collection efficiency by as much as 100% in comparison to the conventional source, filter pump system, even where the same nanoparticle source is present, the same filter and the same pump is used in the different order. The utilization of this arrangement of the pumping scheme may also benefit the collection of the nanoparticles. By injecting low volatility solvents into the inlet of the pump with the nanoparticle loaded gas stream, the dry pump may also be utilized as a wet scrubber with better than 90% collection efficiency. Suitable solvents are the various available ISQPAR™ media and PURASOLV™ media.

The additional pressure that occurs from the introduction of a gas stream into the system is also a factor. Most rough vacuum pumps can reach ultimate pressures of less than 50 mTorr in a closed vacuum system without the introduction of gas into the system. The addition of gas flow to the vacuum chamber changes this base pressure considerably as the expansion of the ambient condition gas at near vacuum yields a higher gas volume that must be pumped from the system. This base pressure will also increase with the presence of line expansions and constrictions that occur with the presence of vacuum chambers and traps in the system (Brunner, W. F. and Batzer, T. H., "Practical Vacuum Techniques", Krieger Publishing Co., New York, 1974; and O'Hanlon, J. F., "A User's Guide to Vacuum Technology", Wiley, New York, 1980. This increase in base pressure coupled with the temperature drops observed with evaporation flow elements puts the operating parameters of the system below the vapor pressure curve.

For this inert gas condensation process to work at a reasonable production rate, a method of vaporizing the pigments must be found that allows a high operating temperature for the system while maintaining the proper gas flow and pressure characteristics in the system.

Collection in liquids yields two advantages. First, it protects the surface of the particles from contamination providing a temporary liquid cover over them. Second, the process provides a slurry that can be handled easily. The liquid dispersion medium can be a solvent, polymer monomer, or prepolymers (Dixon, J. P., Martin, J. A., and Thompson, D., U.S. Pat. No. 5,717,159, (February 1997); Hendrickson, W. A., Wright, R. E., Allen, R. C., Baker, J. A., and Lamanna, W. M., U.S. Pat. No. 5,030,669.

Previous work with evaporated pigments has found that the immediate dispersion of pigment nanoparticles is often beneficial in the formation of a stable dispersion of nanoparticles in the collection liquid. The collection systems previously utilized were sparge units that bubbled the dust-laden gas through the collection liquid and scrubbed the nanoparticle materials from the gas itself.

Former work arrived at the use of high power aspirators to both collect the nanoparticles produced in liquids and also to supply vacuum to the evaporation chamber at the same time. Although it worked sufficiently well at the lab scale, it was difficult to implement at the pilot plant scale for materials other than pigments. This technique is now significantly improved in this application with some variations to increase the system vacuum detailed in FIG. 2. With the use of the combined liquid collection/vacuum supply system, many of the prior obstacles to high rate evaporation and liquid collection were overcome. This current capability of the system is a liquid collection efficiency of nearly 90% of the material contacting the scrubbing system.

Although the evaporation rate of material per hour may be in the 500–600 gm/hr range, other factors impact on the efficiency and productivity of the system. The overall production rate; however, is also impacted by the time needed to replenish the evaporated material after each successive charge is gone.

The large scale production of material from this system also has consequences in terms of particle size control. There are often references in the literature about the ability to tailor the particle size of nanoparticles formed by the inert gas condensation method by increasing the back pressure of inert flux gas in the system (Siegel, R. W. and Eastman, J. A., Material Research Symposium Proceedings, 132, p. 3, 1989; Granquist, C. G. and Buhrman, J., J. Appl. Phys., 47, p. 2200, 1976; Aumann, C. E., Skofronick, G. L. and Martin, J. A., J. Vac. Sci. Tech. B, 13(3), p. 1178, 1995).

A full-scale production system would have four major pieces of equipment to produce either a solvent or solvent/prepolymer nanoparticle slurry. The four main pieces of equipment would be 1) the evaporator, 2) the vacuum chamber and feed systems, 3) the mechanical vacuum pumps and 4) the liquid collection system.

In addition to the obvious product areas of paint pigment manufacture, this fully developed system for the production of nanoparticles, particularly pigment nanometer particles and especially organic pigment nanoparticles and their dispersions will find significant outlets in forming pigment dispersions for paints, toners, inks, colorant systems, plastic/resin coloration, coating colorization, pharmaceutical coloration, stable colorant solutions, and the like.

Dry, coated and uncoated nanoparticulate pigment sampleshave also been manufactured for commercial primer and toner usage. Dry uncoated samples of pigment nanoparticle inkjet inks for the production of printing inks and toners, and other nanoparticulate pigment dispersions have been evaluated for use in inkjet inks.

The production and efficiency of collection rate of nanoparticulate materials has been increased significantly to rates that are scaleable to large sized production lots by practice of the invention. The utilization of nanophase pigments in particular technical areas may also be dependent, in part, on the dispersion of the nanoparticles into particular liquid media of choice. An added bonus of the program has been the improved ability to collect and disperse the nanoparticles into different liquid media. This liquid media can be solvents, carriers, reactive compositions, coating solutions, oils, polymer monomers or prepolymers or mixtures of these liquids. This feature, in addition to the increased collection/condensation efficiency is an added advantage of the inventive process over other processes presently available in this field. The dispersion of these nanoparticles into these different liquids aids in their ease of processing and also in the protection of any reactive surfaces from oxidation.

The technology that has been developed during this program also has applications outside the narrow confines of specific pigments, but is generically useful for any pigment that can be provided in a vapor state and which can be condensed by cooling in a liquid medium. They can also be collected wet in different liquid media in which they can form stable dispersions for use in a wide variety of technical areas such as discussed above.

In this application:
"pigment" means any insoluble solid particulate, excluding those comprised solely of an element in its pure form, and organic pigments are included;
"organic pigment" means a pigment which contains an organic group and which may or may not also contain at least one metal atom;
"inorganic pigment" means a pigment which contains at least one metal atom but which does not contain an organic group;
"ultrafine" means having a mean number average diameter of less than 0.1 micrometer, preferably in the range of 0.001 to 0.1 micrometer, more preferably in the range of 0.001 to 0.08 micrometer, most preferably in the range of 0.001 to 0.05 micrometer; and having a standard deviation in the range of .+−0.0.5x, where x is the mean number average particle diameter;
"gas evaporation technique" means any method involving the evaporation of a substance in the presence of a nonreactive gas to provide ultrafine pigment or pigment precursor particulate;
"metal oxide" means any oxide of a metal whether a pure metal oxide or an layer of oxidized metal surrounding a metallic core, and the later being generated by exposure of ultrafine metal particles to an oxidizing atmosphere;
"precursor form" means a compound that precedes the formation of another compound; and
"tinctorial strength" means selective absorption of electromagnetic radiation in the visible range so as to achieve optimum color and clarity.

The present invention provides a nonaqueous pigment or pigment dispersion comprising organic particles or other pigment particles or an aqueous dispersion of certain these particles, the particles having a means number average particle diameter in the range of 0.001 to 0.1 micrometer (1 to 100 nanometers), preferably dispersed in a dispersing medium. Preferably the mean number average particle diameter is in the range 0.001 to 0.08 micrometer (1 to 80 nanometers) and most preferably 0.001 to 0.05 micrometer (1 to 50 nanometers). The dispersions can contain pigment from 0.001 to 50% by weight, preferably from 0.001 to 25% by weight, and more preferably, from 0.001 to 10% by weight of the total composition.

A non-limiting example of the manner in which a dispersion according to the present invention may be prepared includes:

a) vaporizing an organic, inorganic, metal (to be later at least surface-oxidized), metal oxide, or a pigment or pigment precursor, in the presence of a nonreactive gas stream or a reactive gas stream to provide ultrafine (e.g., 1 to 100 nanometers, number average or weight average diameter) particles (especially pigment or pigment precursor particles), b) transporting the ultrafine nanometer particles suspended in the gas stream by a mechanical pump to a liquid dispersing medium, as for example, the mechanical pump located before the dispersing medium or the mechanical pump containing the liquid dispersing medium, the gas containing the particles into or the gas containing the particles intimately contacting the dispersing medium, to provide a dispersion of particles in the medium, c) the gas (absent the particles) is separated from the dispersing medium, and d) the dispersing medium used to carry the collected pigment particles or the dispersing medium optionally being separated from the pigment particles to provide non-dispersed pigment particles.

Pigments and organic pigments are materials well known in the art and have an established meaning to those skilled in the art. Organic pigments include those containing chromophore groups such as: azo type, phthalocyanine type, quinacridone type, anthraquinone type, dioxagine type, indigo type, thioindigo type, perynone type, perylene type, isoindolene type, and the like. Other examples are apparent to those skilled in the art. Representative examples of organic pigments include metal phthalocyanines which are described in detail in "Phthalocyanine Compounds", by F. H. Moser and A. L. Thomas, Rheinhold Publishing Corporation, New York (1963). Typical metal phthalocyanines and phthalocyanine compounds include unsubstituted metal phthalocyanine, aluminum phthalocyanine, aluminum polychlorophthalocyanine, antimony phthalocyanine, barium phthalocyanine, beryllium phthalocyanine, cadmium hexadecachloro phthalocyanine, cadmium phthalocyanine, calcium phthalocyanine, cerium phthalocyanine, chromium phthalocyanine, cobalt phthalocyanine, cobalt chlorophthalocyanine, copper 4-aminophthalocyanine, copper bromochlorophthalocyanine, copper 4-chlorophthalocyanine, copper 4-nitrophthalocyanine, copper phthalocyanine, copper polychlorophthalocyanine, deuteriometal phthalocyanine, dysprosium phthalocyanine, erbium phthalocyanine, europium phthalocyanine, gadolinium phthalocyanine, gallium phthalocyanine, germanium phthalocyanine, hafnium phthalocyanine, halogen substituted metalphthalocyanine, holmium phthalocyanine, indium phthalocyanine, iron phthalocyanine, iron polyhalophthalocyanine, lanthanum phthalocyanine, phenylphthalocyanine, lithium phthalocyanine, lutecium phthalocyanine, magnesium phthalocyanine, manganese phthalocyanine, mercury phthalocyanine, molybdenum phthalocyanine, neodymium phthalocyanine, nickel phthalocyanine, nickel polyhalophthalocyanine, osmium phthalocyanine, palladium phthalocyanine, palladium chlorophthalocyanine, alkoxymetalphthalocyanine, alkylaminometalphthalocyanine, alkylmercaptophthalocyanine, aralkylaminometalphthalocyanine, aryloxymetalphthalocyanine, arylmercaptophthalocyanine, copper phthalocyanine piperidine, cycloalkylaminometalphthalocyanine, dialkylaminometalphthalocyanine, diaralkylaminometalphthalocyanine, dicylcloalkylaminometalphthalocyanine, hexadecahydrometalphthalocyanine, imidomethylphthalocyanine, octaazametalphthalocyanine, tetraazametalphthalocyanine, tetra-4-acetylaminometalphthalocyanine, tetra-4-aminobenzoylmetalphthalocyanine, tetra-4-aminometalphthalocyanine, tetrachloromethylmetalphthalocyanine, tetradiazomethalphthalocyanine, tetra-4,4-dimethyloctaazametalphthalocyanine, tetra-4,5-diphenyloctaazzmetalphthalocyamine, tetra-(6-methylbenzothiazoyl)metalphthalocyanine, tetra-p-methylphenylaminometalphthalocyanine, tetramethylmetalphthalocyanine, tetra-naphthotriazolylmetalphthalocyanine, tetra-4-naphthylmetalphthalocyanine, tetra-4-nitrometalphthalocyanine, tetra-peri-naphthylene-4,5-octaazametalphthalocyanine, tetra-2,3-phenyleneoxidemetalphthalocyanine, tetra-4-phenyloctaazametalphthalocyanine, tetraphenylmetalphthalocyanine, tetrapyridylmetalphthalocyanine, tetra-4-trifluoromethylmercaptophthalocyanine, tetra-4-trifluoromethylmetalphthalocyanine, 4,5-thionaphtheneoctaazaphthalocyanine, platinum phthalocyanine, potassium phthalocyanine, rhodium phthalocyanine, samarium phthalocyanine, silver phthalocyanine, silicon phthalocyanine, sodium phthalocyanine, thorium phthalocyanine, thulium phthalocyanine, tin chlorophthalocyanine, tin phthalocyanine, titanium phthalocyanine, uranium phthalocyanine, vanadium phthalocyanine, vanadyl phthalocyanine, ytterbium phthalocyanine, zinc chlorophthalocyanine, and zinc phthalocyanine.

Examples of other organic pigments that may be used and which are commercially available include Anthrapyrimidine Yellow (C.I. Pigment Yellow 108), Disazo Yellow GG (C.I. Pigment Yellow 128), Quinacridone Magenta Y (C.I. Pigment Red 122), Phthalo Blue beta (C.I. Pigment Blue 15:3), Phthalo Blue alpha (C.I. Pigment Blue 15:2), Permanent Red 2B (calcium) (C.I. Pigment Red 48:2), Quinacridone Magenta B (C.I. Pigment Red 202), Paliotol.RTM. Yellow 183 (no C.I. No.), Diarylide Yellow (C.I. Pigment 21108), Wachtung Red B (C.I. Pigment Red 48), Perinone Orange (C.I. Pigment Orange 43), Tetrachloroisoindolinone Yellow R (C.I. Pigment Yellow 110), Perylene Red Y (C.I. Pigment Red 224), and Perylene Maroon (C.I. Pigment Red 179). Other examples are apparent to those skilled in the art and may be found in references such as Lambourne (below).

Several methods are available for characterizing a pigment dispersion. The most common involves the particle size distribution expressed as the weight percentage of pigment falling within a given size range. R. Lambourne, in "Paint and Surface Coatings", John Wiley & Sons, (1987), p. 132, lists the typical size limits for the two major classes of pigments as: organic pigments: 0.01 to 1.00 micrometer (10 to 1000 nm) inorganic pigments: 0.10 to 5.00 micrometer (100 to 5000 nm).

These values are indicative of the overall range of particle sizes typically encountered after conventional dispersion techniques. The distribution of particle sizes is dependent on the means of particle formation. Where mechanical milling is used to comminute the particles, extremely wide distributions result. For example, EP 1 544 839 describes a method for obtaining easily dispersed copper phthalocyanine that involves chemical pretreatment of the pure pigment. A typical result (from Table 3 of the reference) shows a weight average particle diameter of 0.069 micrometers (69 nm) with a distribution width of 0.440 micrometers (440 nm). Much narrower distributions are obtained by using the instant invention gas evaporation technique.

In the present invention, the vapor phase of evaporated particles and the particles themselves may be generated by any evaporative process such as subliming pigments or any other evaporation process for pigments at subatmospheric atmospheric or superatmospheric pressures in the presence of a nonreactive gas to generate ultrafine pigment particles and then effecting direct introduction into a dispersing medium, such as described herein, has not been taught.

As noted above, dry organic pigments have also been generated by H. Toyotama (supra), using a gas evaporation technique. The reference teaches the need to provide mechanical energy in the form of ultrasound, which shows that, once isolated, the dry pigment particles have an affinity for each other and, therefore, energy must be provided to break the aggregates apart. One possible aspect of the present invention that can be used to differentiate from H. Toyotama in that the vacuum provided is dynamic and a constant flow of non-reactive gas stream is swept past the vaporization source, at rates that can be generally in the range of 25 to 2000 SCCM (standard cc's per minute) for a laboratory scale apparatus, during pigment evaporation. Thus, while Toyotama is dependent on the residence time of the ultrafine particles in the growth zone (see Granqvist and Buhrman, J. Appl. Phys., 47, (1976), p. 2200) to determine the ultimate particle size obtained for a given pressure, the instant invention provides a secondary means for particle migration from the growth zone, i.e., convective currents are important as in H. Toyotama (supra) but also the non-reactive gas stream assists in carrying particles from the growth zone. Thus, at a given pressure, the present invention provides particles that are significantly smaller than particles achieved in a static (Toyotama) system. Furthermore, the particles are introduced into the dispersing medium before they have a chance to aggregate, thus removing the need for external mechanical energy, such as ultrasound, to achieve a dispersed state.

The advantage of an evaporative technique over conventional milling with respect to particle size and shape is most apparent when organic pigments are used. Typical transmission electron micrographs would show, for example, copper phthalocyanine particles dispersed in a liquid polymer comprising at least 50 wt. percent perfluoropolyether segments (the polymer is disclosed in U.S. Pat. No. 4,440,918, Example 1) using the process of the instant invention. The particles of the invention would be within a narrow size range, have a smooth surface, and are essentially free of voids. A prior art particle of copper phthalocyanine which has been subjected to rotorstator milling for 24 hours in the presence of the same perfluoropolyether medium as described above would have a large number of surface asperities and appears to be a compaction of agglomerates with a large number of voids present. Those pigment particles would be much smaller in size than those of the present invention.

Dispersing media useful in the present invention include any liquid, aqueous (for certain organic or inorganic pigments) or nonaqueous (for certain other organic and inorganic pigments). Fluids having a viscosity up to 100,000 P or more are envisioned as useful. Preferred viscosities are less than 5000 cP, more preferably less than 3000 cP, and most preferably less than 1000 cP. Representative dispersing media include water, gelatin/water emulsion, alcohol/water, including mixtures such as ethanol/water, glycerol/water, etc. and polar organic liquids such as acetone, 2-butanone, cyclohexanone, 2-undecanone, methanol, ethanol, isopropanol, glycerol, ethylene glycol, ethyl acetate, alkanes (e.g., hexane, cyclohexane), methyl methacrylate, 2-hydroxyethylmethacrylate, chloroform, methylene chloride, alkylalkanolamines, such as 2-dimethylaminoethanol, 1-dimethylamino-2-propanol, 1-dieth -dimethylamino-2-methyl-1-propanol, and 2-dibutylaminoethanol, and combinations thereof.

Useful nonpolar organic liquids include hexane, a mixture of isoparaffinic hydrocarbons, b.p. 156° C.–176° C. (ISOPAR G® organic liquid, Exxon, Houston, Tex.), benzene, toluene, xylenes, styrene, alkylbenzenes, and combinations thereof. In addition, liquid polymers such as polydimethylsiloxane (e.g., DC200™) liquid polymer $MW_n$=200, Dow Chemical, Midland, Mich.), polydimethyl-co-methylphenylsiloxane (e.g., DC 704™, liquid polymer (Dow Chemical), polyethylene glycol (e.g. CARBOWAX® 200, CARBO WAX® 400, and CARBO WAX® Carbowax® 600 polyethylene glycols, $MW_a$ =200, 400, and 600, respectively, Union Carbide Corp., Danbury, Conn.), a polymer comprising perfluoropolyether segments (LTM™ fluoropolymer, 3M, St. Paul, Minn.), and polycaprolactones (PLACCEL™ polycaprolactones 305, 303, 308, $MW_n$ =300–850, Daicel Chemical Jind. Co. Ltd., Tokyo, Japan) may be used.

Additionally, external heat may be applied to melt a solid (e.g., a polymer, a wax, or any low melting organic compound such as naphthalene) and generate a liquid dispersing medium suitable for use in the present invention. Examples of solids that may be used include paraffin wax, low molecular weight polyester (e.g., FA™-300 polyester, Eastman Chemical Co., Rochester, N.Y.), and polyethylene.

The dispersing medium may be a pure liquid or a mixture of liquids and may contain additional ingredients, including inorganic and organic soluble materials and mixtures thereof. Such additives include surface-active agents, soluble polymers, insoluble particulates, acids, bases, and salts.

By surface active agent is meant an additive that has a preferred spatial orientation at an interface, e.g. large molecules having a hydrophilic head group and a hydrophobic tail (e.g. OLOA™ 1200 surfactant, Chevron Corp., Richfield, Calif., and Amoco™ 9250 surfactant, Amoco Chemical Co., Naperville, Ill.). The weight percent of surface active agent to dispersing medium can be from 0 to 20%, preferably 0 to 10%, and more preferably 0 to 5%. Other surface active agents useful in the present invention are well known to those skilled in the art. terephthalate), polystyrene-co-4-vinylpyridine, polystyrene-co-2-vinylpyridine, polyethyleneglycol, poly(ethylene oxide), poly(propylene oxide), polyethylene, polypropylene, poly (acrylonitrile), poly(phenyl vinylene carbonate), poly(vinyl acetate), poly(vinyl alcohol), poly(vinyl trifiluoroacetate), poly(vinyl chloride), poly(ethylene-co-propylene adipate), poly(1,4-phenylene sebacate), poly(3,5-dimethyl-1,4-phenylene sulfonate), poly (.beta.-alanine), poly (hexarnethylenesebacamide), poly(vinyl cymantrene-co-4-vinylpyridine), etc. The percent of soluble polymer in the dispersing medium may be from 0 to 70% by weight, preferably 0 to 50%, more preferably 0 to 30%, and most preferably 0 to 25%, or each range with at least 0.5% minimum therein. Other polymers useful in the present invention are known to those skilled in the art.

Insoluble particulates useful as additives in the dispersing medium of the present invention, for example, in the manufacture of pigmented composite structures, include latex particles, kaolin, alumina, glass microspheres, and other common fillers known to those skilled in the art. The weight percent of filler compared to the total dispersion can be from 0 to 80%, preferably 0 to 60%, and more preferably 0 to 50%.

The non-reactive gas can be virtually any gas that does not react with the pigment under the conditions of the experiment. Typical choices are carbon dioxide (in some cases), He, Ne, Ar, Xe, and $N_2$. Mixtures of two or more non-reactive gases can also be used. When modification of pigments or pigment precursors is desired, a reactive gas can be introduced through a gas inlet that is positioned so as to minimize reaction with the bulk material in the crucible and allow thorough mixing of the reactive gas with the particles entrained in the gas stream, thereby allowing reaction with the particles to occur. The reactive and non-reactive gases generally are at room temperature but the temperature can be elevated or reduced as desired. The term reactive includes 1) direct reaction with the particles, as in the case of metals, for example, with $O_2$, NO, $NO_2$, $CO_2$, CO, $AsH_3$, $H_2S$, $H_2Se$, $NH_3$, trimethylchlorosilane, methylamine, ethylene oxide, water, HF, HCl, or $SO_2$, or combinations thereof, to form the corresponding oxides or other compounds; 2) wetting, as described in UK Patent 736,590 to increase dispersibility in which pigment particles are exposed to the vapor of a volatile liquid which may be identical to the dispersing medium or may be miscible with the dispersing medium, prior to contacting the bulk dispersing medium so as to create a solid/liquid interface while the pigment particles are suspended in the gas stream; and 3) adsorption, in which a volatile substance is introduced in the gas prior to contacting the dispersing medium, similar to wetting, but the substance is either not a liquid under normal conditions (atmospheric pressure and 25° C.), the substance is not miscible with the dispersing medium, or else the substance acts to protect the surface of the ultrafine pigment particles from the dispersing medium or additives within the dispersing medium. Typical substances that could be adsorbed include polymers such as poly(methylmethacrylate) and polystyrene, and surface active agents.

Temperatures for evaporation of pigment useful in the method of the present invention depend on the type of pigment being used and generally range from 25° C. to around 500° C. when organic pigments are used and from 25° C. to around 1200° C. or even 25° C. to 3000° C. when inorganic pigments or inorganic pigment precursors are used.

Temperatures of the dispersing medium useful in the method of the present invention depend on the particular medium being used and generally range from −78° C. to 400° C., preferably from −50° C. to 300° C., and most preferably from 0° C. to 200° C.

Pressures useful in the method of the present invention range from about 0.001 to 300 torr, preferably 0.01 to 200 torr, more preferably from 0.01 to 100 torr, and most preferably from 0.1 to 50 torr. The composition of the combination non-reactive and reactive gas stream can be from about 5 to 100% non-reactive gas or combination of non-reactive gases, preferably from 25 to 100%, more preferably from 50 to 100%. A reactive gas introduced through an additional inlet downstream from the evaporation source can be present as a component in the gas stream in a percent ranging from 0 to about 95%, preferably from 0 to 75%, and more preferably, 0 to 50%.

An apparatus for providing dispersions of ultrafine pigment particles comprises:

a) a furnace connected to a collection vessel, the furnace containing a heating means (e.g., resistive, inductive, e-beam, infrared, laser, plasma jet, or sputtering system) and adapted to contain at least a first and optionally a second gas inlet tube, said second tube being located downstream from said first tube, and a mechanical pump for evacuating the furnace and directing the gas phase carrying evaporated pigment and pigment particle to the collection zone or vessel, the zone and/or vessel containing a dispersing medium b) an optional system (e.g., a ceramic, plastic, or metal crucible or slab that can be preloaded with material or which can be continuously or batch-wise fed during operation of the apparatus, or the electrodes can be the means) for introducing an organic or inorganic pigment or pigment precursor into said furnace and evacuation thereof;

c) optionally a system (e.g., a micro metering valve, electronic flow controller, or gas dispersing tube) for introducing through the first inlet tube a first, nonreactive gas stream into the furnace;

e) an evaporating or gas phase producing system (e.g., energy input as by e-beam, infrared, laser, inductive, resistive, or plasma jet) for evaporating of generating a gas phase of the pigment or pigment precursor particles into the first gas stream;

f) a collection/condensation medium between or coincident with the evaporating gas phase producing system for allowing condensation of the vaporized pigment or pigment precursor particles (e.g., decreasing the temperature, raising the pressure, changing the chemical nature of the nonreactive gas, controlling the length of the transfer tube, controlling the gas flow rate, or combinations thereof) in the first gas stream to produce a dispersion of ultrafine pigment or pigment precursor particles in the first gas stream in a dispersing medium in the collection/condensation zone;

g) optionally, a system (e.g., tube, valve, pipe, a micro metering valve, electronic flow controller, or gas dispersing tube) for introducing into the furnace through the second inlet tube a second, reactive gas stream, to allow reaction with the pigment precursor particles, to provide ultrafine pigment particles;

h) a region within the system for collecting particles in the collection/condensation vessel (e.g., bubbling into or impinging particles onto the dispersing medium).

The innovation described herein involves at least a repositioning of the vacuum pump in the system which a) allows a higher level of vacuum to be achieved, b) reduces the particle size of the pigments formed and c) increase the efficiency of wet collection of the nanoparticles formed to greater than 95%. This is a substantial improvement over the prior art where the wet collection occurred prior to the source of vacuum in the system. In prior art, the efficiency of the wet collection was a maximum of 50% at low gas flow rates (e.g., 2 liters/minute). This modest level of efficiency drops substantially at higher gas flow rates through the system. The present invention can use higher flow rates, higher than 3 liters/minute, higher than five liters/minute, higher than seven liters per minute, higher than 10 or 20 liters/minute and even higher than 50 liters per minute and provide collection efficiency rates of greater than 80%, greater than 90% in some cases, and still as high as 95% in some other cases.

The innovation described involved a repositioning of the vacuum pump in the system to a) allow a higher level of vacuum to be achieved, b) reduce the particle size of the metallic nanoparticles formed and c) increase the efficiency of wet collection of the nanoparticles formed to greater than 95%. This is a substantial improvement over the prior art where the wet collection occurred prior to the source of vacuum in the system. In prior art, the efficiency of the wet collection was a maximum of 50% at low gas flow rates. This drops substantially at higher gas flow rates through the system.

With the presence of nanoparticles in the gas stream, oil sealed mechanical pumps do not function in this altered processing scheme. Dry, mechanical pumps which utilize gas purged bearings are the most preferred for this application. These pumps can tolerate the presence of large amounts of particulate in the gas streams that are being pumped and convey the particulate from the inlet to the exhaust of the pump. Various models can also convey various liquids and vapors through their interiors. These pumps are in wide. spread usage in the semiconductor industry. For this application, scroll pumps did not provide sufficient performance without powder buildup in the interior of the pump. Dry lobe and screw pumps provided a sufficient amount of vacuum for the evaporation processes without powder buildup. Most preferred were dry screw pumps that could tolerate the presence of low volatility liquids (ISOPAR® organic liquid, DOWANOL® organic liquid, PURASOLV® organic liquid, kerosene, diesel fuel, etc.) in the pump mechanism. These liquids could be injected into the inlet of the vacuum pump and used to wash the nanoparticles formed. The collection efficiency this method is >95% of the nanoparticulate material entering the vacuum pump. These pumps typically operated at 1–10 Torr utilizing gas flows of up to 50 liters/mm of an inert gas at 100° C.

As shown in FIG. 1, apparatus 10 for providing the present invention dispersions comprise furnace 12 having therein crucible 14 supported by electrodes 15 connected to an external power supply, not shown, and containing vaporizable pigment 16 or pigment precursor 17. Gas inlet tube 18 allows non-reactive gas 19 to be introduced into furnace 12 to envelop and assist in formation of fine particles 20 and facilitate their transportation through transfer tube 22 and through primary dry mechanical pump 23 to collection vessel 24. Collection vessel 24 contains liquid dispersing medium 26 into which transfer tube 22 having tube end 21 allows transported pigment particles 20 and non-reactive gas 19 to bubble into medium 26 (FIG. 1) or it allows transported pigment particles 20 and non-reactive gas 19 being transported through transfer tube 22 having tube end 23 to impinge upon medium 26. Condensor 32 is provided to return any evaporated liquid from liquid medium 26 back to collection vessel 24. Condensor 32 is connected to trap 38 and pump 40. Pump 40 is used to evacuate entire apparatus 10 prior to and during use. Bypass valve 34 and bypass tube 36 allow for facile evacuation of furnace 12 prior to onset of pigment 16 or pigment precursor 17 evaporation. Valves 42 and 44 allow isolation of apparatus 10 from pump 40.

Other reactor designs to provide dispersions of the invention can be envisioned, including a rotary metal atom reactor such as described in Metal Vapour Synthesis in Organometallic Chemistry, J. R. Blackborow and D. Young, Springer-Verlag (New York), 1979 and a spinning disk assembly such as described in Jpn. J. Appl. Phys., 13, 749 (1974), as long as the location of the mechanical pump is after the system for generating the gas phase of pigment or pigment particles carried in the gas phase and between or coincident with the condensation/collection zone. Both types of reactors could be used to generate dispersions of organic pigments. However, the use of a reactor having the design shown in FIG. 1 is much preferred in these instances. These and other alterations are within the scope of this invention.

In addition to resistive heating, other means of applying heat to the pigment or pigment precursor may be envisioned. These include laser heating, inductive heating, plasma jet, plasma arc discharge, laser flashing, sputtering, and others known to those skilled in the art.

In a preferred embodiment the present invention provides pigment nanoparticles, dispersions of pigment nanoparticles, which pigment nanoparticles are solid (i.e., solidified) dispersions of pigment particles in a polymer, the particles having a mean average particle size of less than 0.1 micrometer (100 nanometers). In addition, the particles have a narrow size distribution and the dispersions are transparent, resistant to flocculation, and exhibit greater tinctorial strength as noted above. The amount of pigment present in a coating is generally in the range of 0.001 to 50.0 weight percent, 0.001 to 30.0 wt percent, 0.001 to 10.0 wt percent, 0.001 to 5.0 wt percent, 0.001 to 3.0 wt percent, 0.001 to 1.0 wt percent, and more preferably 0.001 to 0.1 wt percent. Generally no surfactants or other dispersing aids are required when using the ultrafine particles of the present invention.

There are distinct advantages for using ultrafine particles as colorants in manufacturing processes and products. The color strength increases and diffuse scattering decreases as the particle size decreases. Where the colored device also refracts light, increased diffuse scattering decreases the optical properties of the device. For medical devices or layers that provide critical physical or chemical properties, it is prudent to minimize the amount of pigment required to achieve a specified level of color to preserve those properties; hence, a pigment with the highest color strength is desirable. For example, the optimum color strength of copper phthalocyanine occurs for particle sizes much less than 0.1 micrometer. While molecularly dissolved dyes have maximal color strength with minimal diffuse scattering, water insoluble pigment particles will not bleed or leach from the device during wear or routine handling as has been observed with molecularly dissolved dyes. Dispersions of ultrafine particles are more stable than their larger sized counterparts. This resistance to agglomeration prior to solidification of the liquid polymer makes the manufacturing of a contact lens less sensitive to uncontrollable environmental factors. Smaller particles form more stable dispersions/suspensions than do larger particles.

The dispersions of the present invention can be used to prepare articles by means of any type of article forming, such as casting, coating, toning, printing, molding, including injection molding and extrusion processes, casting, including spin casting, etc. Such articles include fibers and molded articles including colored ophthalmic devices such as contact lenses. Coated dispersions of the present invention can be used to prepare high quality graphic arts constructions such as sublimation type thermal transfer recording media, and any other applications where dispersed pigment is useful. The coating can be accomplished by any means known in the art including bar coating, knife coating, curtain coating, meniscus coating, slot coating, etc.

A wide variety of particle coating processes are known in the art. For larger size particles, e.g., for 1 mm or greater, the simplest, most cost effective process is direct immersion of particles in a coating composition (e.g., liquid, gel, powder, etc.) and removing the coated particles from the coating environment (with drying or agitation, as needed to fix the coating and separate the particles). Particles may be carried on a conveyor belt and sprayed or otherwise coated with coating compositions. Particles may be projected of dumped into a deposition coating environment (e.g., spray chamber, vacuum deposition chamber, electrostatic chamber, etc.) where the coating is applied. Mixtures of particles and coating compositions may be mixed, then sprayed to fix of dry the coating on the surface of particles.

What is claimed is:

1. A process of collecting pigment nanoparticles comprising forming a vapor of a pigment that is solid at room temperature, the vapor of the pigment being provided in an inert gaseous carrying medium, solidifying at least some of the pigment within the gaseous steam, moving the pigment nanoparticles in a gaseous environment through a dry mechanical pumping system, and while the particles are within the dry mechanical pumping system or after the nanoparticles have moved through the dry pumping system, contacting the pigment nanoparticles with an inert liquid collecting medium.

2. The process of claim 1 wherein the pigment nanoparticles comprise an inorganic pigment.

3. The process of claim 1 wherein the pigment nanoparticles comprise an organic pigment.

4. The process of claim 2 wherein the inert liquid collecting comprises an organic liquid.

5. The process of claim 3 wherein the inert liquid collecting comprises an organic liquid.

6. The process of claim 2 wherein pigment particles within the dry mechanical pumping system are contacted with an inert liquid collecting medium.

7. The process of claim 3 wherein pigment particles within the dry mechanical pumping system are contacted with an inert liquid collecting medium.

8. The process of claim 2 wherein pigment particles are contacted with an inert liquid collecting medium after leaving the dry mechanical pumping system.

9. The process of claim 3 wherein pigment particles are contacted with an inert liquid collecting medium after leaving the dry mechanical pumping system.

10. The process of claim 1 wherein the nanoparticles are collected by physical filtration.

11. The process of claim 1 wherein a vacuum system is installed to provide additional driving force to collect nanoparticles by physical filtration.

12. An apparatus for providing dispersion of ultrafine pigment particles having an average size of between 0.5 and 100 nanometers comprising:

a) a source of vaporized pigments connected to a mechanical pump and a collection vessel, the source of vaporized pigments providing an stream of non-reactive gas flow away from the source and towards a mechanical pump;

b) a source of organic pigment, inorganic pigment and/or pigment precursor into the source of vaporized pigment;

c) a source of non-reactive gas to carry pigment material towards the mechanical pump;

d) a fluid source for a fluid to collect pigment particles and/or condense pigment vapor into particles;

e) a mechanical pump for moving the non-reactive gas with pigment material and the fluid to collect pigment particles and/or condense pigment vapor into particles; and f) a contact zone for the i) non-reactive gas and pigment material and ii) the fluid to collect pigment particles and/or condense pigment vapor into particles;

wherein the contact zone is within the mechanical pump or after the mechanical pump.

13. The apparatus of claim 12 having a source of pigment precursor and a source for a reactive gas stream to effect reaction of pigment precursor particles, to provide pigment particles.

14. The apparatus of claim 12 wherein the fluid is introduced into the mechanical pump to first contact the non-reactive gas with pigment material.

15. The apparatus of claim 12 wherein the non-reactive gas is removed from the mechanical pump after pigment material content in the gas has been reduced by contact with the fluid.

16. The apparatus of claim 15 wherein a liquid recycling system to return liquid into the mechanical pump is provided so that recycled liquid with particulate pigment content comprises the recycled liquid.

17. The apparatus of claim 16 wherein tho source of liquid provides an organic liquid to the mechanical pump.

* * * * *